United States Patent [19]

Yoshino et al.

[11] Patent Number: 4,843,479
[45] Date of Patent: Jun. 27, 1989

[54] DATA COMMUNICATION APPARATUS

[75] Inventors: Motoaki Yoshino; Tsunehiro Watanabe; Shigeo Miura, all of Tokyo; Takeshi Toyama, Hiratsuka; Masatomo Takahashi, Tokyo, all of Japan

[73] Assignee: Canon Kabushiki Kaisha, Tokyo, Japan

[21] Appl. No.: 75,981

[22] Filed: Jul. 21, 1987

[30] Foreign Application Priority Data

Jul. 23, 1986 [JP] Japan ............................ 61-174051

[51] Int. Cl.$^4$ ............................................ H04N 1/32
[52] U.S. Cl. .................................... 358/257; 379/100
[58] Field of Search ..................... 358/257; 379/100

[56] References Cited

U.S. PATENT DOCUMENTS

| | | | |
|---|---|---|---|
| 4,135,156 | 1/1979 | Sanders | 370/94 |
| 4,168,400 | 9/1979 | de Couasnon | 370/94 |
| 4,430,651 | 2/1984 | Bryant | 370/94 |
| 4,646,160 | 2/1987 | Iizeuka | 379/100 |
| 4,710,951 | 12/1987 | Itezono | 358/257 |
| 4,741,021 | 4/1988 | Kotani | 379/100 |

Primary Examiner—Howard W. Britton
Attorney, Agent, or Firm—Fitzpatrick, Cella, Harper & Scinto

[57] ABSTRACT

A data communication apparatus comprises: data communicator for performing data communication; an input device for inputting called party name data representing a called party name for the purpose of designating a called party who is to receive the data to be communicated; a controller for controlling the data communicator so that the data communicator communicates the called party name data which is input through the input device; and a designator for giving the control means an instruction representing the designation of the called party name data to be communicated so that the controller allows the data communicator to communicate the called party name data in accordance with the designation from the designator. Since called party data is sent out as an image with the called party being designated at a transmitting station in a first priority order and the called party name being registered in a second priority order, it is possible to perform positive communication with the called station.

14 Claims, 6 Drawing Sheets

1ST PAGE

2ND PAGE

CALLED PARTY NAME
CHANGED BY PAGE
ACCORDING TO
DESTINATION POINTER

1ST PAGE

2ND PAGE

CALLED PARTY NAME
CHANGED BY PAGE
ACCORDING TO
DESTINATION POINTER

DATA COMMUNICATION APPARATUS

BACKGROUND OF THE INVENTION

1. Field of the Invention

The present invention relates to a data communication apparatus capable of handling image data, character-code data or the like.

2. Related Background Art

A conventional type of data communication apparatus such as a facsimile device is arranged to read an original sheet therein and automatically transmit information including only the transmission date and time, the number of the original sheets transmitted, and the telephone number and name of the sender which are in advance registered in a transmitting apparatus. But no data relative to the called party is contained in such sender information. The earlier U.S. patent application filed by the same applicant on Nov. 24, 1986 as Ser. No. 933,906, discloses a system related to the present invention, but the earlier application contemplates an arrangement in which the amount of sender information is increased on the first page but is reduced on the succeeding pages.

In all of the aforesaid cases, an additional page carrying the name of the called party is required, or the name of the called party must be written somewhere on the original. This may require an extra operation upon transmission of the original sheet.

SUMMARY OF THE INVENTION

It is an object of the present invention to provide an improved data communication apparatus.

It is another object of the present invention to provide a data communication apparatus in which the above-described problem is eliminated.

It is another object of the present invention to provide a data communication apparatus arranged to send out data representing the name of a called party or parties.

It is a further object of the present invention to provide a data communication apparatus arranged to send the name of a called party or parties to a called party's data communication apparatus in the form of information issued from a sender.

It is a still further object of the present invention to provide a data communication apparatus arranged to send the names of called parties in accordance with the order of priority.

Further objects of the present invention will become apparent from the following description of preferred embodiments of the present invention.

DETAILED DESCRIPTION OF THE PREFERRED EMBODIMENTS

The preferred embodiments of the present invention will be described below with reference to the accompanying drawings.

Figure 1:
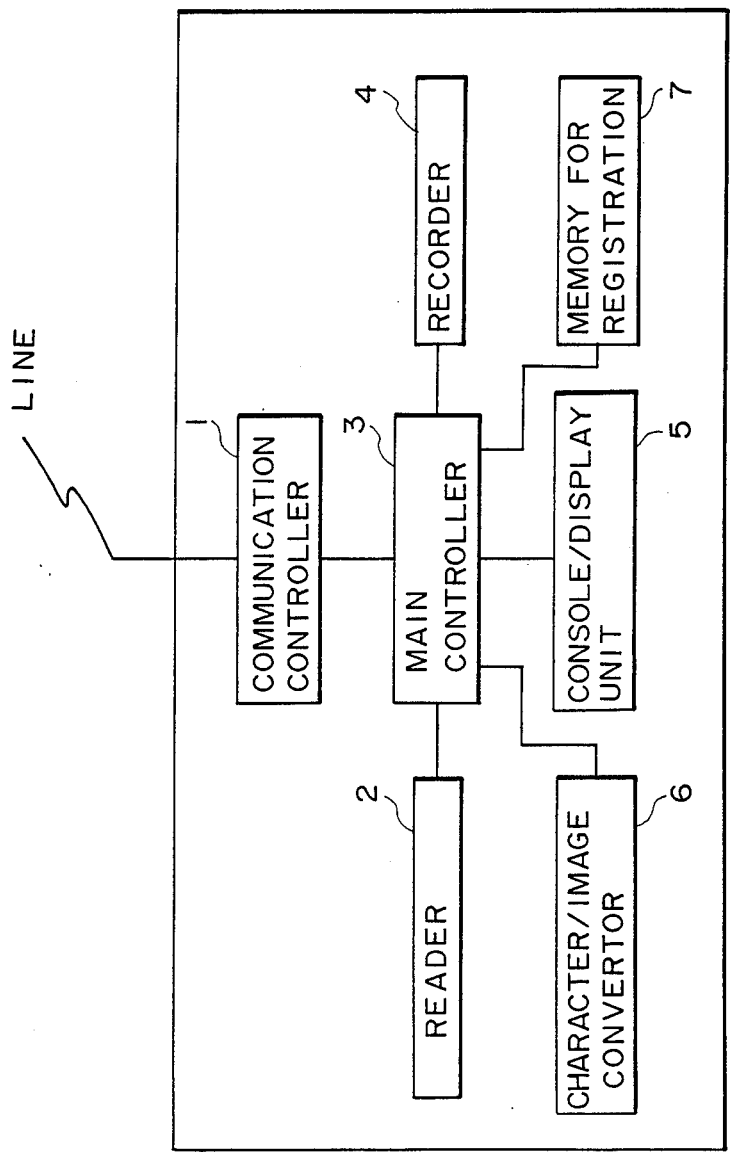
FIG. 1 is a block diagram showing one preferred embodiment according to the present invention.

FIG. 1 is a block diagram showing a configuration of a facsimile device according to one of the preferred embodiments of the present invention.

Referring to FIG. 1, a communication controller 1 is provided to perform control of facsimile communication. The communication controller 1 essentially includes a MODEM for modulating and demodulating an image signal or a facsimile procedure signal, an encoder for performing encoding in accordance with the "modified Huffman (MH) coding scheme" or the "modified READ (MR) coding scheme", a decoder for performing decoding in accordance with either of these schemes and a dialing circuit operable for sending a call signal through communication line. The communication controller 1 having the aforesaid arrangement transmits and receives image signals on the basis of the facsimile communication procedures recommended by the CCITT.

A reader 2 is arranged so as to read an original, and is configured by a known reader circuit typically employed in facsimile devices and others.

A main controller 3 operates to control the facsimile device, and is provided with a microcomputer and peripheral units such as read-only memory (ROM), a random access memory (RAM) and others.

A recorder 4 performs recording of image signals, and is structured by a known printer typically employed in facsimile devices.

A console/display unit is disposed so as to control the facsimile device, and comprises a plurality of input key switches, a display such as a liquid crystal display, a scanning circuit for the display and the key entry, and the others.

A character/image converter 6 comprises a character generator and the like to convert a character code into a corresponding image.

A registration memory 7 is arranged to register therein dial numbers and names of called parties corresponding to one-touch dial keys and abbreviated dials.

Figure 2:
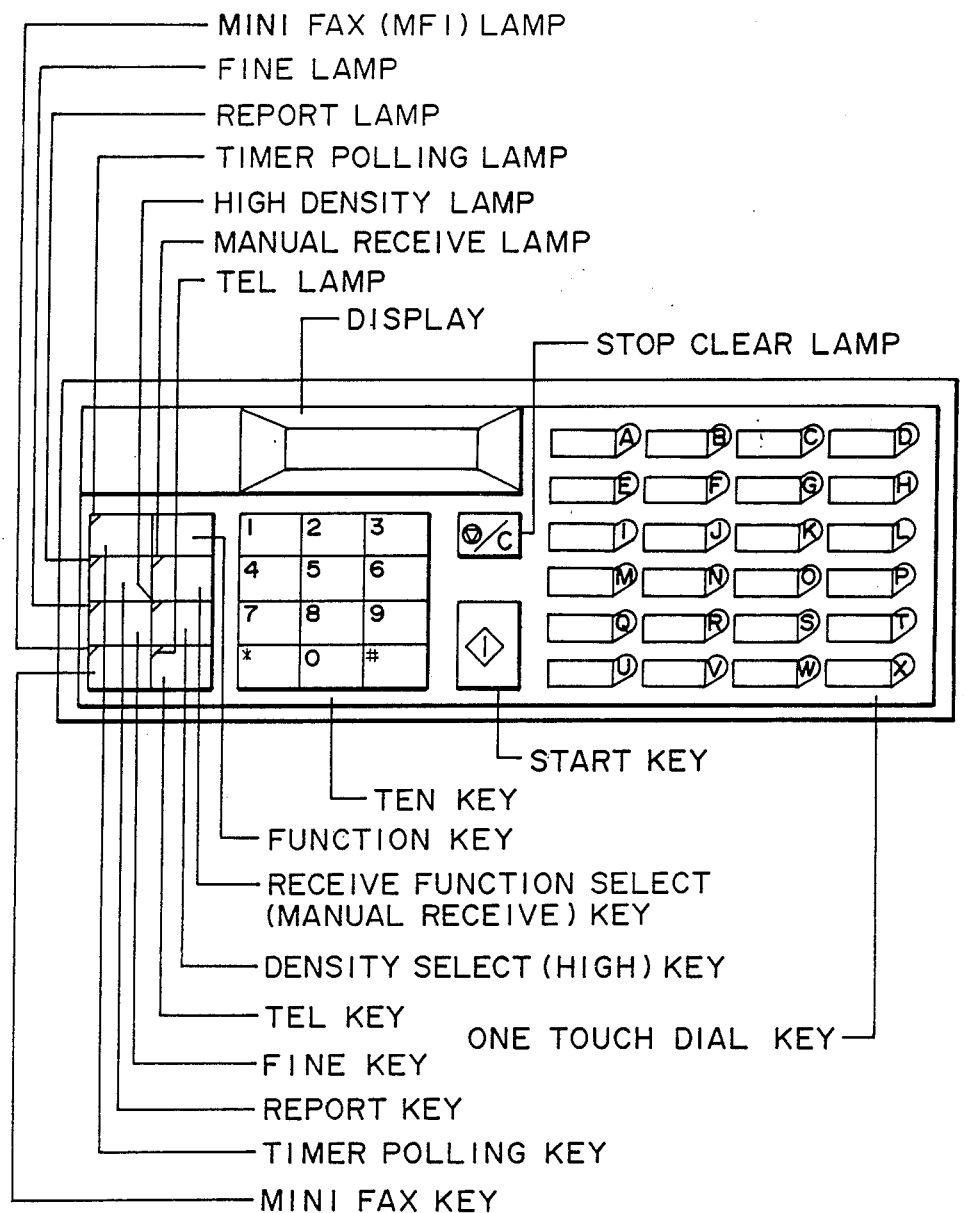
FIG. 2 is a view illustrating a console/display unit used in the embodiment shown in FIG. 1.

FIG. 2 illustrates the details of one example of the console/display unit 5.

Figures 4, 5:
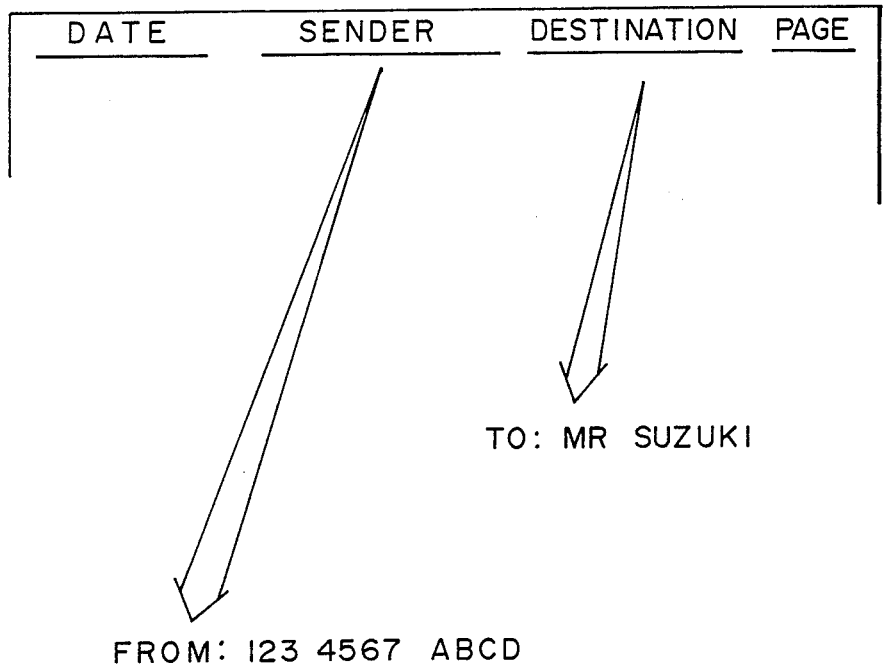
FIG. 4 illustrates an output example of the name of a called party.
FIG. 5 is a diagram showing the concept of a destination pointer used in another embodiment.

The telephone numbers and names of called parties corresponding to one-touch dial keys A to X are registered in the registration memory 7. When a given one of the one-touch dial keys A to X is depressed, the main controller 3 reads from the registration memory 7 the telephone number and name of the called party corresponding to the depressed key and these are displayed on the display unit. Simultaneously, the main controller 3 performs a call via the communication controller 1 to start communication. When an image is to be transmitted, required information according to the format shown in FIG. 4 is added prior to readout and transmission of the original. At this time, the image is generated through the character/image converter 6.

Figure 3:
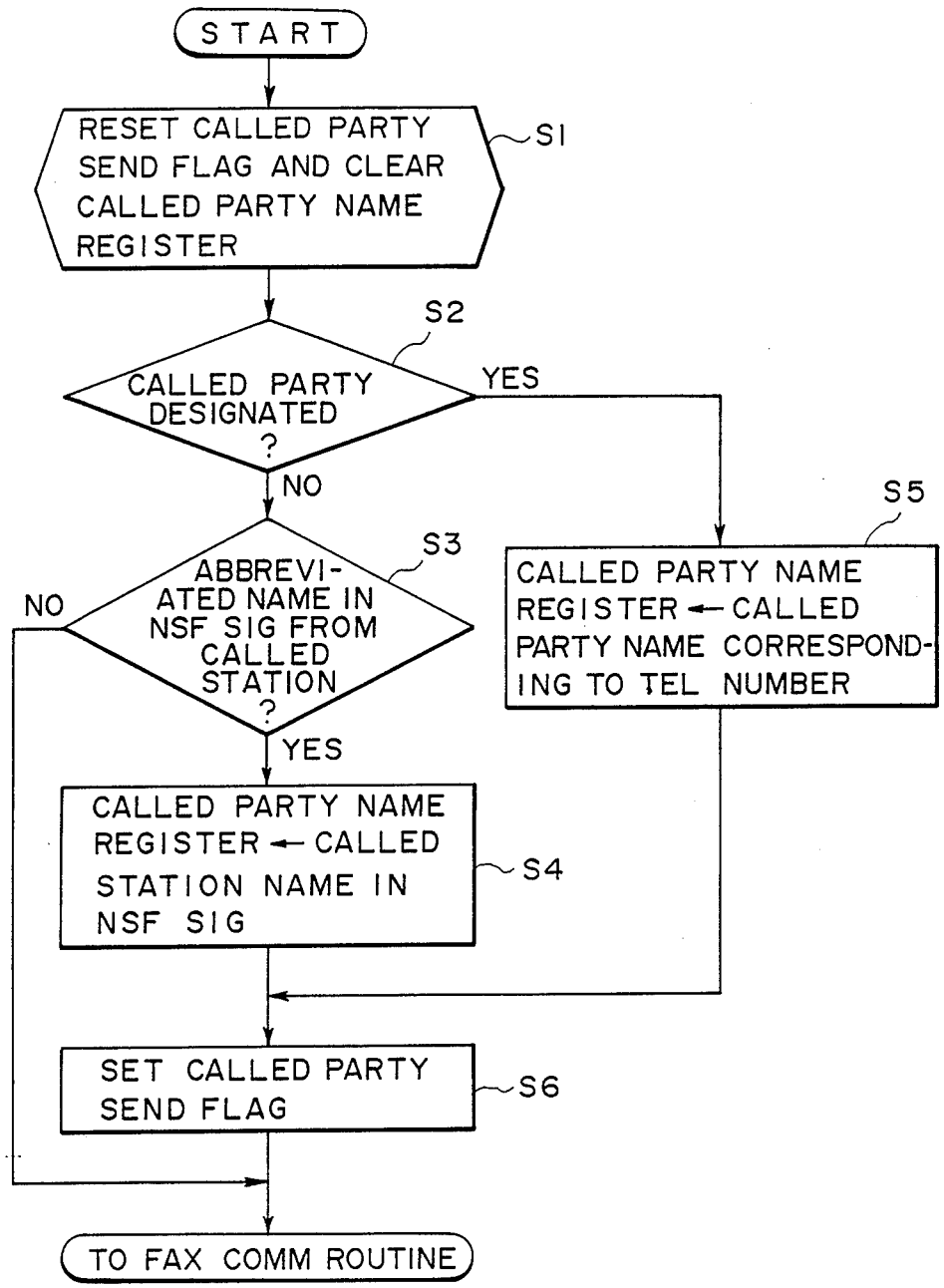
FIG. 3 is a flow chart of a main controller used in the embodiment shown in FIG. 1.

FIG. 3 is a flow chart showing judgment as to the output conditions of a called-party item contained in the aforesaid added information.

In Step S1, a called party send flag is reset (OFF) and a called party name register is cleared (in this case, the register stores spaces exclusively). Judgment is made in Step S2 as to whether or not a called party is designated. Specifically, if any called party's name corresponding to a one-touch dial key is registered, data assigned to the key is transferred to the called party name register (Step S5) and the called party send flag is set (ON) (Step S6).

Unless a desired called party's name is registered, the NSF (non-standard facility identification signal) of a called station is analyzed in Step S3, in which judgment is made as to whether the registration of the name of the called party at the called station is present or absent. If the name of the called party is registered, the corresponding data is transmitted to the called party register in Step S4, and in Step S6 the called party flag is set. In Step S3, if it is judged that the name of the called party is not registered, the process proceeds to a facsimile communication routine with the called party send flag being reset, and then facsimile transmission is performed. If the called party flag is set, data representing the called party's name is transmitted in the form of image data prior to the sending of data representing the original image.

The main controller 3 generates sender information according to the format shown in FIG. 4 prior to the sending of the original image. At that time, information relative to a called party is determined on the basis of the data stored in the resister and the data of the flag which is set in accordance with the aforesaid flow chart shown in FIG. 3. Namely, if the called party send flag is set, the data of the called party name register is transmitted to be displayed after "TO:". If the called party send flag is reset, neither called party's name nor "TO:" is displayed.

The aforesaid preferred embodiment is arranged such that one called party's name is registered for each one-touch dial key. It is, however, common practice for one facsimile device to be shared by a plurality of persons at a called station. For this reason, the aforesaid embodiment may be modified so that one telephone number and a plurality of called party's names can be registered for each one-touch dial key, and a desired one or more may be selected from the registered contents upon transmission.

In the aforesaid preferred embodiment, although imformation as to a called party is only sent out as an image, notification of such information may be sent to the called station in initial procedures, and, during communication, it is possible to display the information at the called station.

As described above, since data representing a called party is sent out as an image by designating the called party at a calling station in a first priority order and the name registered at the called party in a second priority order, it is possible to perform communication with a correct called party.

Although the above-described embodiment has been described with reference to a facsimile device by way of example, the present invention is not confined solely to such a facsimile device. The present invention is of course applicable to every kind of data communication apparatus such as a Telex which is arranged to transmit and receive character code data or the like.

The aforesaid embodiment refers to the arrangement in which information indicating a single called party's name is sent out by one transmission. The following is a description of another preferred embodiment in which information indicating a different called party's name for each page can be sent out by one transmission.

It is to be noted that the arrangement shown FIG. 1 is substantially the same as the essential arrangement of a second embodiment which will be described later. However, they differ from each other in respect of the control operation of the main controller 3.

Figure 6:
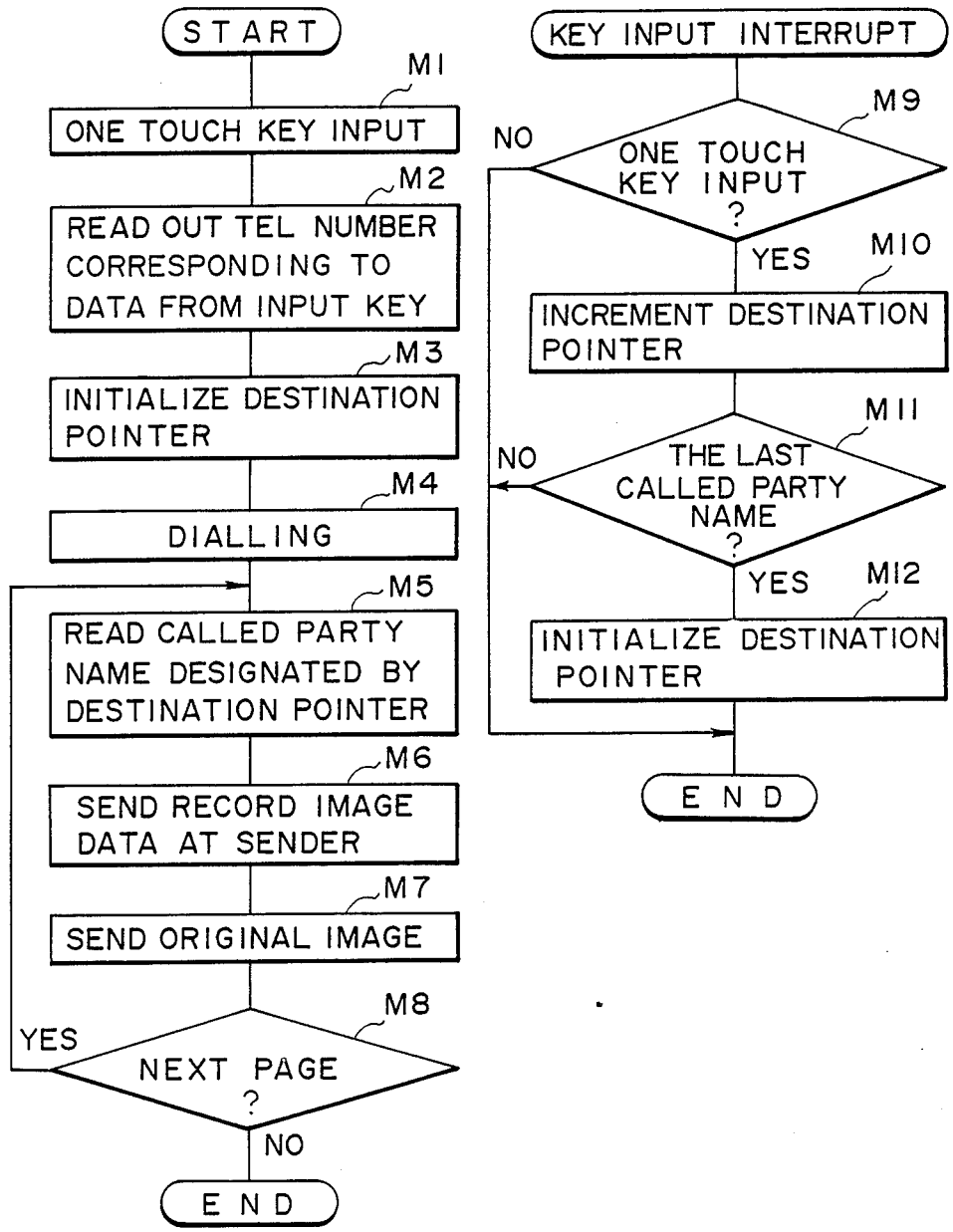
FIG. 6 is a flow chart of a main controller in another preferred embodiment.

FIG. 6 is a flow chart showing the control operation of the main controller 3 used in the second embodiment.

In Step M1, the telephone number of a called party or destination is selected through the operation of a given one-touch dial key on the console/display unit 5. In Step M2, the main controller 3 reads from the registration memory 7 data representing the destination corresponding to the depressed one-touch dial key. In Step M3, a destination pointer is initialized, and then, in Step M4, the main controller 3 transmits the telephone number read from the registration memory 7 to the communication controller 1 and in turn a call signal is sent by a dialling circuit of the communication controller 1. In Step M5, data representing the called party's name designated by the aforesaid destination pointer is read from the registration memory 7. In Step M6, the called party name data read from the registration memory 7 is converted into image data by the character/image converter 6, and the image is then sent out in the form of compressed image data. In Step M7, the original image read in the reader 2 is sent out likewise in the form of a compressed image.

When a user depresses a key (function key) for selecting a called party's name on the console/display unit 5 during the transmission of one page of the original, a key input interrupt is made and the process proceeds to Step M9 shown in FIG. 6. In Step M9, judgment is made as to whether or not any of the one-touch dial keys is depressed. If the answer is "YES", the process proceeds to Step M10, in which the destination pointer is incremented by one.

Referring to FIG. 5 showing examples of the contents stored in the registration memory 7, at every time that the destination pointer is incremented by one, it points the position of data corresponding to the next called party's name.

Referring back to FIG. 6, in step M11, judgment is made as to whether or not the called party's name is last one. If the answer is "YES", the process proceeds to Step M12, in which the destination pointer is initialized. In Step M8, judgement, is made as to whether or not the next page is present. If the answer is "YES", the process returns to Step M5. If any key for selecting a called party's name is depressed during the transmission of the aforesaid one page, the destination pointer is up-dated. Therefore, the new called party's name is read out in Step M5, and the following steps are performed.

Figure 7:
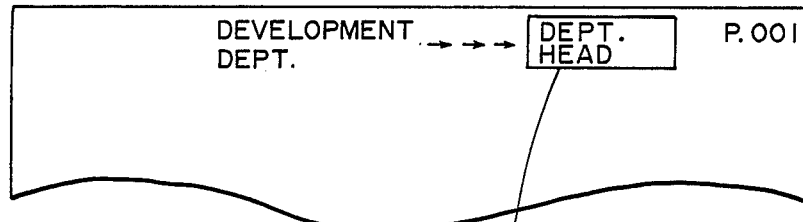
FIG. 7 illustrates an output example of the names of called parties in the embodiment shown in FIG. 6.
Figure 7:
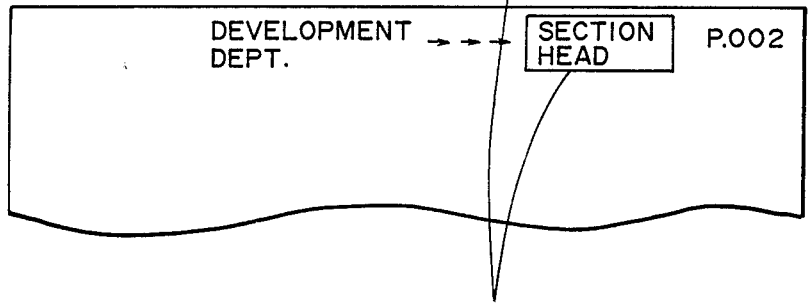

FIG. 7 shows one example of an image produced at a called station when a called party's name is changed page by page.

In this manner, an original having data representing a plurality of called parties' names can be transmitted to a predetermined single facsimile device called by one call.

As described above, in accordance with the present invention, since a called party can be designated at a data transmitting station, it is possible to transmit data to a desired called party. In addition, the arrangement is simple because a desired called party's name is input by input means and the input called party's name is transmitted as data through data communication means.

While the above provides a full and complete disclosure of the invention, various modifications, alternative constructions and equivalents may be employed without departing from the true spirit and scope of the invention. Therefore, the above description and illustrations should not be construed as limiting the scope of the invention, which is defined by the appended claims.

We claim:

1. A data communication apparatus comprising:
   data communication means for communicating data including communication data;
   memory means for storing called party name data to designate a called party that is to receive the data; and
   control means for causing the called party name data stored in said memory means to be added to the communication data to be communicated and for controlling said data communication means to communicate the communication data with the called party name data.

2. An apparatus according to claim 1, wherein said data communication means communicates a plurality of communication data and said control means is capable of adding different called party name data to each of the plurality of communication data.

3. An apparatus according to claim 1, wherein said memory means stores a plurality of called party name data and said control means selects one of the plurality of called party name data to be added to the communication data.

4. An apparatus according to claim 3, further comprising designating means for designating one of the plurality of called party name data to be added to the communication data, wherein said control means selects the one called party name data in response to the designation by said designation means.

5. An apparatus according to claim 1, further comprising designating means for designating a called party, wherein said control means reads called party name data corresponding to the called party designated by said designating means from said memory means and adds it to the communication data.

6. An apparatus according to claim 5, wherein if said communication means receives called party name data from a calling party and if the called party name data designated by said designating means is not stored in said memory means, said control means adds the received called party name data.

7. An apparatus according to claim 5, wherein said designating means includes a plurality of keys, said memory means stores called party name data in correspodence with the plurality of keys, and said control means reads from said memory means the called party name data corresponding to input from one of the plurality of keys.

8. An apparatus according to claim 7, wherein the plurality of keys each comprise a one-touch dial key.

9. A data communication apparatus comprising:
   transmitting means for transmitting data including called party name data used to designate a called party that is to receive the data;
   memory means for storing the called party name data therein;
   receiving means for receiving destination party name data indicating a destination party to which the data is to be transmitted by said transmitting means; and
   control means for controlling the transmission of a selected one of the called party name data stored in said memory means and the destination party name data received by said receiving means.

10. An apparatus according to claim 9, wherein said memory means stores a plurality of called party name data, said apparatus further comprises designating means for designating one of the plurality of called party name data which is to be transmitted, and said control means controls the transmission of the called party name data stored in said memory means in response to the designation by said designating means.

11. An apparatus according to claim 10, wherein if the called party name data designated by said designating means is not stored in said memory means, said control means causes said transmitting means to transmit the destination party name data received by said receiving means.

12. A facsimile apparatus comprising:
    communication means for communicating image data;
    memory means for storing therein called party name data for designating a called party that is to receive the image data transmitted by said communication means;
    designating means for designating the called party name data stored in said memory means; and
    control means for controlling the transmission of the called party name data stored in said memory means in accordance with the designation by said designation means,
    wherein if said communication means receives called party name data from a destination party and if the called party name data designated by said designated means is not stored in said memory means, said control means causes the called party name data received by said communication means to be transmitted.

13. An apparatus according to claim 12, wherein said designating means includes a plurality of keys, said memory means stores called party name data in correspondence with the plurality of keys, and said control means reads from said memory means the called party name data corresponding to input from one of the plurality of keys.

14. An apparatus according to claim 13, wherein the plurality of keys each comprise a one-touch dial key.

* * * * *

UNITED STATES PATENT AND TRADEMARK OFFICE
CERTIFICATE OF CORRECTION

PATENT NO. : 4,843,479
DATED : June 27, 1989
INVENTOR(S) : MOTOAKI YOSHINO ET AL.

It is certified that error appears in the above-identified patent and that said Letters Patent is hereby corrected as shown below: On the title page:

AT [56] REFERENCES CITED

U.S. Patent Documents, "Iizeuka" should read --Izuka--.

COLUMN 3

Line 28, "resister" should read --register--.

COLUMN 5

Line 53, "spodence" should read --spondence--.

COLUMN 6

Line 45, "nated means" should read --nating means--.

Signed and Sealed this

Twenty-fourth Day of April, 1990

Attest:

HARRY F. MANBECK, JR.

*Attesting Officer*      *Commissioner of Patents and Trademarks*